United States Patent
Sugawara et al.

(10) Patent No.: US 6,501,610 B1
(45) Date of Patent: Dec. 31, 2002

(54) DETECTING CIRCUIT FOR READ SIGNAL FROM MAGNETIC RECORDING SYSTEM USING PARTIAL RESPONSE

(75) Inventors: Takao Sugawara, Kawasaki (JP); Umeo Oshio, Kawasaki (JP); Takenori Ohshima, Kawasaki (JP); Yoshifumi Mizoshita, Kawasaki (JP); Keiji Aruga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1009 days.

(21) Appl. No.: 08/596,471

(22) Filed: Feb. 5, 1996

(30) Foreign Application Priority Data

Feb. 6, 1995 (JP) ............................................. 7-017870

(51) Int. Cl.⁷ ............................. G11B 5/09; G11B 5/035
(52) U.S. Cl. ............................. 360/65; 360/46; 375/232
(58) Field of Search ............................. 360/46, 51, 65; 375/232, 241

(56) References Cited

U.S. PATENT DOCUMENTS

| | | | |
|---|---|---|---|
| 4,707,681 A | | 11/1987 | Eggenberger et al. |
| 4,786,890 A | | 11/1988 | Marcus et al. |
| 5,060,088 A | * | 10/1991 | Dolivo et al. ............ 360/46 |
| 5,166,837 A | * | 11/1992 | Nakamura ............... 360/46 |
| 5,287,385 A | | 2/1994 | Sugawara et al. |
| 5,394,110 A | * | 2/1995 | Mizoguchi et al. ...... 329/304 |
| 5,400,189 A | * | 3/1995 | Sato et al. ............... 360/46 |
| 5,519,676 A | * | 5/1996 | Kitahara ................. 360/65 |
| 5,521,945 A | * | 5/1996 | Knudson ................. 360/65 |
| 5,541,956 A | * | 7/1996 | Ueda ...................... 375/232 |
| 5,546,245 A | * | 8/1996 | Sato ....................... 360/65 |
| 5,557,482 A | * | 9/1996 | Christensen et al. ..... 360/51 |
| 5,583,889 A | * | 12/1996 | Citta et al. .............. 375/341 |
| 5,585,975 A | * | 12/1996 | Bliss ...................... 360/65 |
| 5,592,340 A | * | 1/1997 | Minuhin et al. ......... 360/65 |
| 5,619,539 A | * | 4/1997 | Coker et al. ............. 360/51 |

FOREIGN PATENT DOCUMENTS

| | | |
|---|---|---|
| JP | 4221464 | 8/1992 |
| JP | 629785 | 2/1994 |

OTHER PUBLICATIONS

Ferguson "Optimal Reception for Binary Partial Response Channels," pp. 493–505.

Knudson, et al. "Dynamic Threshold Implementation of the Maximum–Likelihood Detector for the EPRA Channel," pp. 2135–2139.

Sugawara, et al., "Viterbi Detector Including PRML and EPRML," pp. 4021–4023.

* cited by examiner

*Primary Examiner*—Regina N. Holder
(74) *Attorney, Agent, or Firm*—Greer, Burns & Crain, Ltd.

(57) ABSTRACT

A detection circuit in a magnetic recording and playback apparatus which uses partial response and the maximum likelihood method, in which neither the size of the detection circuit nor the power consumption increase when the partial response order n increases. In this detection circuit, in the circuit that detects a signal read out from a head, either a plurality of equalizers for different target equalization waveforms, or a single variable target equalizer is provided. A detector for the waveform output from an equalizer is connected in series with the detector. A plurality of combinations, each formed by an equalizer and a detector, is connected in parallel to the output of a filter, the outputs of the combinations of equalizers and detectors being input to a switching circuit, which is controlled by a switching control means. The switching control means controls the switching circuit so that just one of the combinations of equalizer and detectors is selected as the detector output. If a variable target equalizer, which is capable of generating two or more different types of equalization waveforms, is used as the equalizer, it is possible to reduce the number of equalizers to one.

21 Claims, 18 Drawing Sheets

Fig. 4 COMPARISON OF WAVEFORMS BETWEEN PR4ML AND EPR4ML

DETECTING CIRCUIT FOR READ SIGNAL FROM MAGNETIC RECORDING SYSTEM USING PARTIAL RESPONSE

BACKGROUND OF THE INVENTION

1. Field of the Invention

The present invention relates to a detecting circuit for a playback signal in a magnetic recording system which uses partial response, and more particularly to a detecting circuit which detects a playback signal which is played back from a head of a magnetic disk apparatus which uses partial response.

2. Description of the Related Art

In recent years, in magnetic disk apparatuses, partial response and detecting circuits using the ML (maximum likelihood) detection method have come into practical use in detecting a read signal from a head.

FIG. 1 shows the overall configuration of a prior art magnetic disk apparatus. A plurality of annular tracks are formed on a magnetic disk 1, and data is written onto these tracks. A head 2 writes data onto these tracks, and reads out data from the tracks. This head 2 is positioned over the magnetic disk 1 by means of a servo circuit 90. The head 2 is connected to a head IC 91, which has a write circuit and an amplifier which amplifies the read-out signal. This IC 91 has connected to it a read/write circuit 92, which handles track information, zone information, and head information. The operation of the servo circuit 90 and read/write circuit 92 is controlled by a control circuit 93.

FIG. 2 shows an example of the configuration of the detecting circuit used in a magnetic disk apparatus of the past. A signal which is recorded onto the magnetic disk 1 is read out by a head 2. The thus read-out signal is passed through an amplifier 3 and a low-pass filter 4, is equalized by an equalizer 5, and is then sent to a detector 6. In the magnetic disk apparatus, partial response and the PRML systems which are coming into practical use, are configured in the same manner.

The most typical system is the PR4ML (partial response class 4) system. If the data bit period delay is expressed as D, the magnetic recording system can be treated as 1−D (step response of 1). Also, because 1+D is used as an equalizer, the equalized output becomes $1-D^2$, this being treatable as the class 4 partial response. In addition, a maximum likelihood detector (generally based on the Viterbi detector) is used, the $1-D^2$ signal is used to detect data.

However, strictly speaking, because of excessive inter-symbol interference, the step response in magnetic recording (an isolated waveform which is the playback by a head of a single magnetization reversal) is not 1. For this reason, an equalizer is used to remove this excessive inter-symbol interference.

It is known that the performance of PRML differs depending upon the partial response class (equalized waveform). For this reason, the inventors of the present invention have already demonstrated a method of performing optimum equalized detection, in the form of a "Viterbi Decoding Control System" (Unexamined Patent Publication (Kokai) No. 4-221464) and "Viterbi Decoding System Including Variable-Order Equalizer" (U.S. Pat. No. 5,287,385). In this system, a single equalizer switches the partial response class (the order n in $(1-D)(1+D)^n$), in response to which the Viterbi detector reference (assumed value) is switched.

However, the size of the Viterbi detector circuit in a maximum likelihood detection system which also uses partial response is an exponentially increasing function of the above-described partial response order n. Therefore, in the system proposed by the inventors of the present invention, because it is necessary to design the detecting circuit for the maximum value of this order n, problems exist with regard to an increase in circuit size and power consumption.

SUMMARY OF THE INVENTION

In view of the above, an object of the present invention is to provide a detecting circuit in a magnetic recording and playback apparatus which uses partial response and the maximum likelihood detection method, the use of which is accompanied by an increase in neither the size nor the power consumption of the circuit in the magnetic recording and playback apparatus, so that the size of the apparatus is not increased even if the partial response order n increases.

To achieve the above-noted object, the present invention is applied to a magnetic recording and playback apparatus in which data, which is recorded on a magnetic recording medium by a head, is read out, this apparatus having an amplifier circuit, a low-pass filter, an equalizer, and a detector for the purpose of detecting the data from the thus read-out signal.

In the detecting circuit of the first aspect of the present invention, after the amplifier circuit and low-pass filter, a plurality of series-connected equalizers and detectors are provided, these being followed by a switching control means. The equalizers are provided for differing equalization target waveforms. The detectors are connected in series with each of the equalizers in accordance with an equalized waveform therefrom and each detector forms a set with an equalizer. These equalizer-detector sets are connected in parallel to the output of the low-pass filter. The switching control means is connected to the outputs of the detectors of the equalizer-detector sets and selects the output of one of these equalizer-detector sets as the detected data. Only the data which is selected by the switching control means is output as the detected output of the detecting circuit of the first aspect of the present invention.

The second aspect of the present invention has an equalizer disposed after an amplifier circuit and a low-pass filter, a plurality of detectors which are connected in parallel to this equalizer, and a switching control means which selects one of the detected data which is output from one of the plurality of detectors. The switching control means selects just one output of detected data from the plurality of detectors as the detected output.

The detecting circuit of the third aspect of the present invention is applied in an apparatus in which the frequency response of the signal read out by the head is expressed as R, and in which the frequency response of the equalization target waveform of order n is $G(f)*Hi(f)$ (where i=1, 2, 3, . . . , n). Therefore, in the detecting circuit of the third aspect, the equalizers are divided into one pre-equalizer and a plurality of n post-equalizers. The pre-equalizer is configured so as to have a response of $G(f)/R(f)$, and the post-equalizers are characterized to have responses of $Hi(f)$ (where i=1, 2, 3, . . . , n). A detector is connected to the output of each of the post-equalizers, these forming post-equalizer-detector sets. These post-equalizer-detector sets are connected in parallel to the output of the pre-equalizer. The output of each of the post-equalizer-detector sets is connected to a switching control means, which selects just one of the detector outputs as the detector output.

In accordance with the present invention, a plurality of equalizers and detectors are provided in parallel to suit a variety of equalization target waveforms, these being switched in accordance with the equalization target waveform. Therefore, in the present invention, it is possible to limit the size of the circuit of each equalizer and detector to the minimum required for the equalization target waveform. As a result, with the present invention, even if the partial response order n increases, no increase is caused in the size of the detecting circuit.

Each of the equalizers and detectors is provided independently. For this reason, by stopping the operation of unneeded circuits which are not selected by the switching control means, it is possible to limit the increase in power consumption.

In the present invention, because it is possible to perform optimum equalization and detection with respect to the normalized recording density on the magnetic disk, it is possible to decrease the required S/N ratio. In addition, with the present invention, for a given S/N ratio it is possible to increase the recording density.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENT

Figure 1:
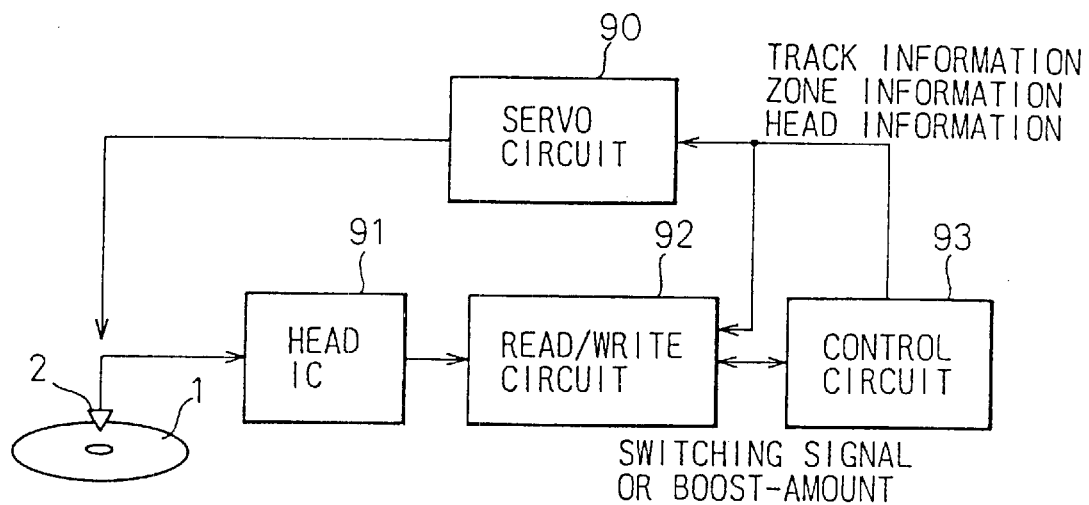
FIG. 1 is a drawing which shows the overall configuration of a magnetic disk apparatus in the prior art.
Figure 2:
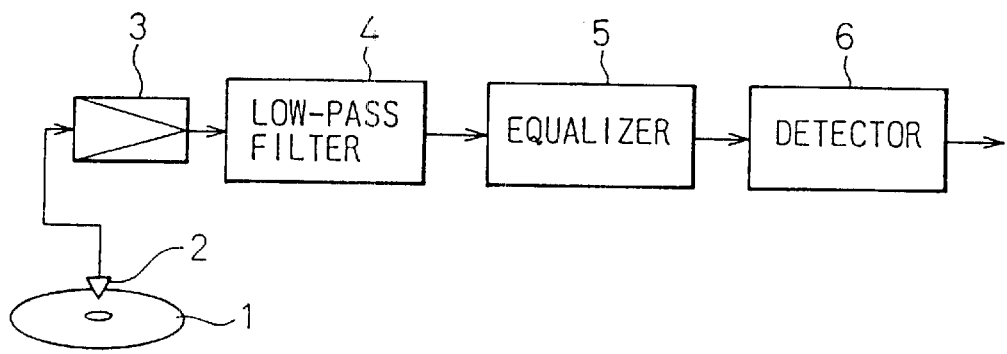
FIG. 2 is a drawing which shows an example of the configuration of a detecting circuit in a prior art magnetic disk apparatus such as shown in FIG. 1.

The preferred embodiments of the present invention will be described in detail, with reference made to the related attached drawings. To make this easier to understand, constitutional elements which are the same as in FIG. 1 and FIG. 2 have been assigned the same reference numerals.

Figure 3:
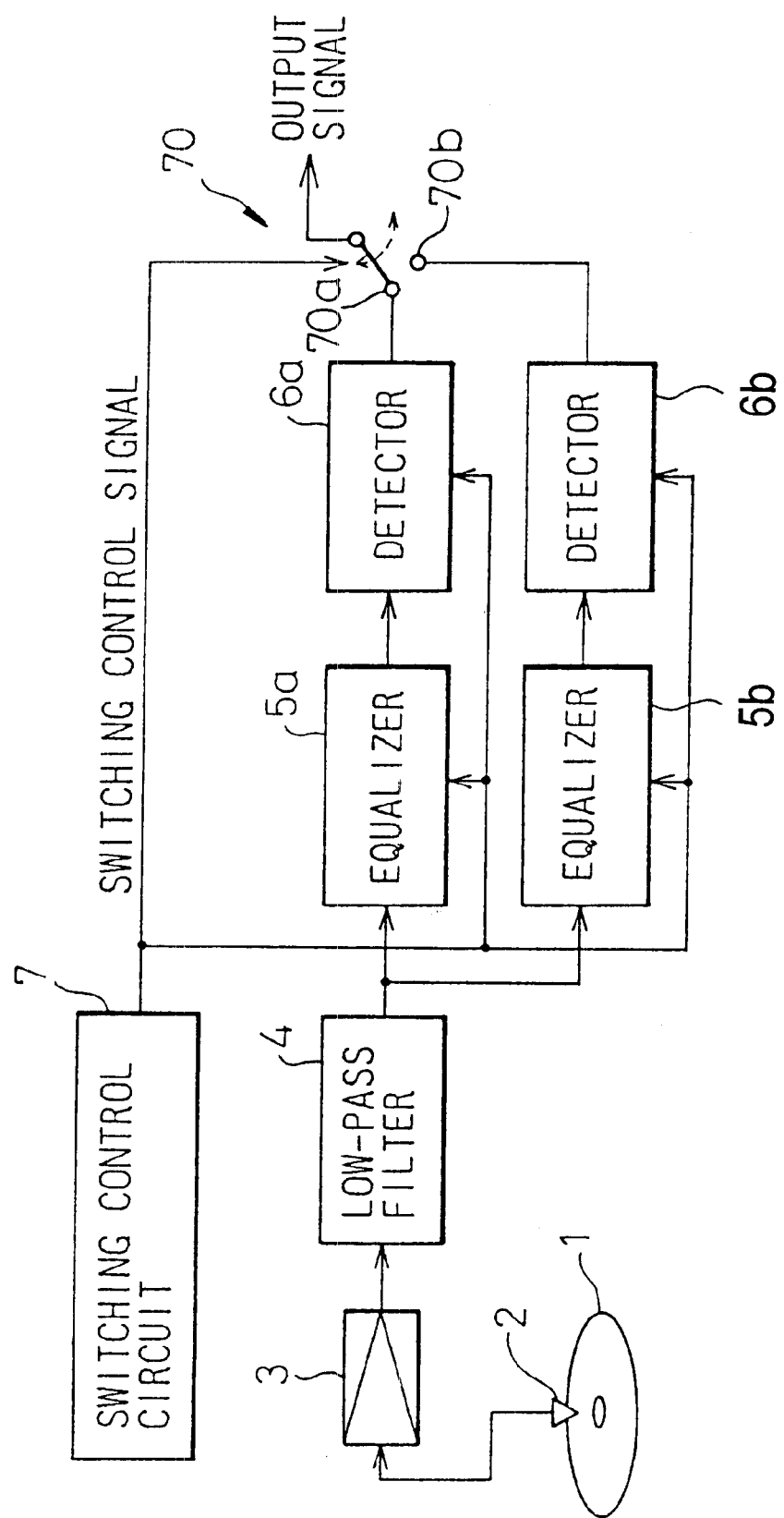
FIG. 3 is a block diagram which shows the configuration of the first embodiment of the present invention.

FIG. 3 shows the block diagram configuration of the first embodiment of the present invention. In FIG. 3, the reference numeral 1 denotes a magnetic recording medium, 2 is a head, 3 is an amplifier circuit, 4 is a low-pass filter, 5a and 5b are equalizers, 6a and 6b are detectors, 7 is a switching control circuit, and 70 is a switch. A signal which is read from the magnetic disk 1 by the head 2 is amplified by the amplifier 3, noise components are eliminated from it by the low-pass filter 4, and the signal is split between the inputs of equalizers 5a and 5b. The equalized outputs of the equalizers 5a and 5b are applied to the inputs of detectors 6a and 6b, respectively. The switching action of the switch 70 and the action of the detectors 6a and 6b are performed in accordance with a switching control signals from the switching control circuit 7.

In this manner, in the first embodiment, there are two sets of equalizers and detectors, equalizer 5a with detector 6a, and equalizer 5b with detector 6b. Switch 7 is switched in accordance with a switching signal from the switching control circuit 7, so that the detected data from the optimal set of equalizer and detector is selected as the output signal.

For example, assume that the equalizer 5a and detector 6a perform equalization and detection for n=1 (class 4: PR4ML), and that the equalizer 5b and detector 6b perform equalization and detection for n=2 (extended class 4: EPR4ML). If operation of the equalizer and detector that are not selected by means of the switching control signal is stopped by this same switching control signal, it is possible to reduce the average power consumption.

A specific embodiment of a system for switching between PR4ML (n=1) and EPR4ML (n=2) has been reported in "Viterbi Detector Including PRML and EPRML." IEEE Transactions on Magnetics, Vol. 29, No. 6, November 1993.

Figure 4:
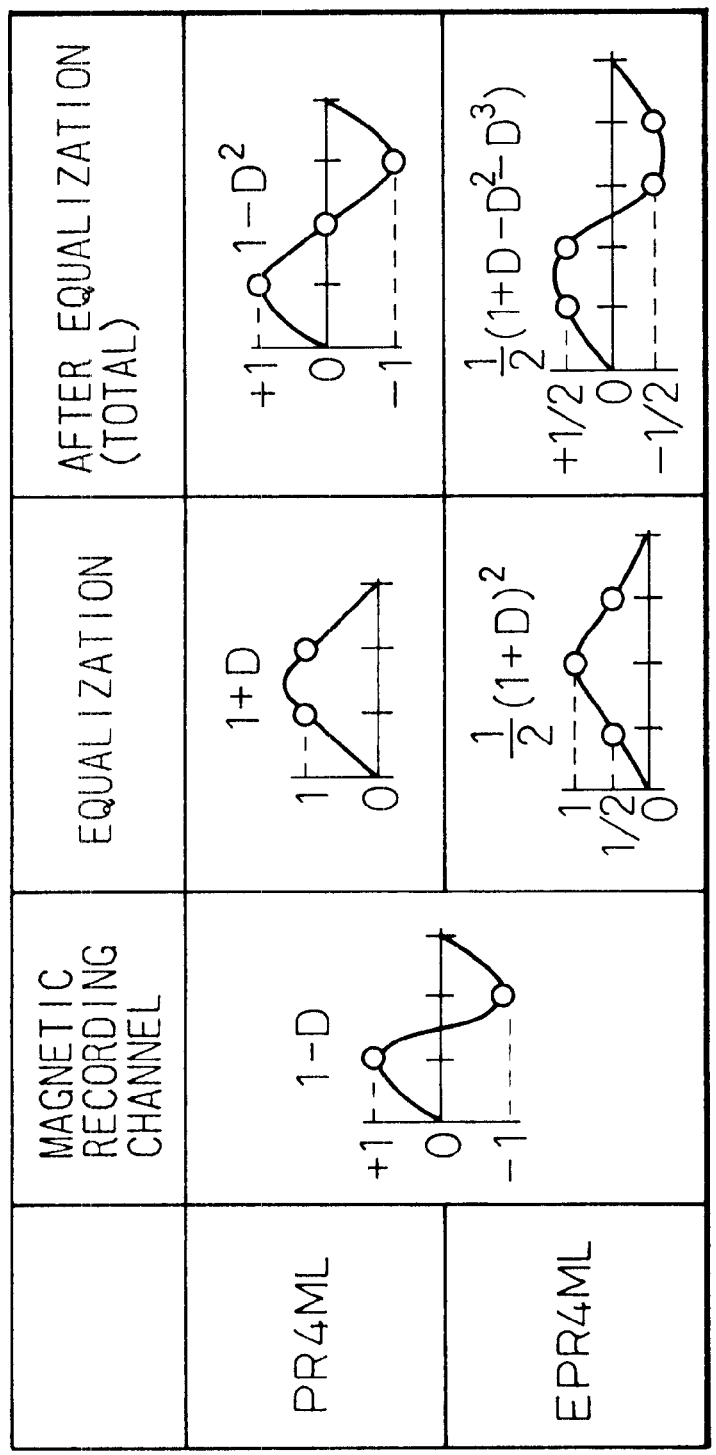
FIG. 4 is a table which presents a comparison of the PR4ML and EPR4ML waveforms which are given in the cited references.
Figure 5:
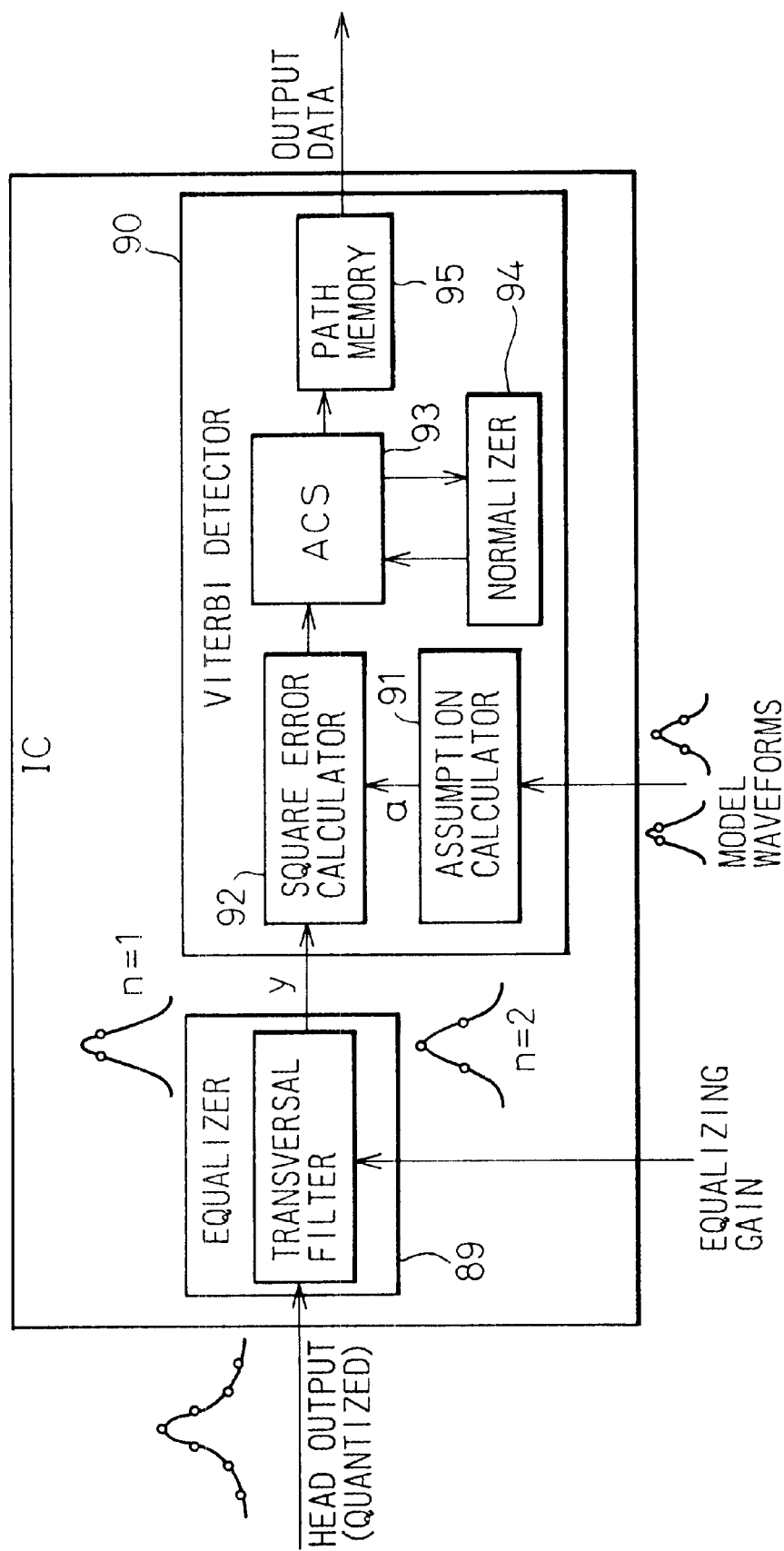
FIG. 5 is a block diagram which shows the configuration of a PR4ML/EPR4ML switching circuit which is given in the cited references.

FIG. 4 shows a comparison of the PR4ML and EPR4ML waveforms which appeared in the above-cited Transactions. The configuration which appeared in this publication is shown in FIG. 5. In the Viterbi detector 90 a square error calculator 92 performs a squaring operation on the detection input signal y from the equalizer 89 and the assumption value a from the assumption calculator 91. An ACS (add compare selector) circuit 93 performs an addition of the current square error and the previously accumulated square error (metric value), the magnitudes of these metric values are then compared, and then the smaller (correct) one is selected. At the path memory 95, the assumed data (code) for the correct metric value is stored, selected and output. At the normalizer 94, normalization is performed to prevent overflow of the metric value.

The table shown below shows the power consumption with the Viterbi detector shown in FIG. 5, and with the detectors 6a and 6b of FIG. 3, which is the first embodiment of the present invention (for the case in which detectors 6a and 6b are independent circuits for equalization and detection of PR4ML and EPR4ML, respectively). Note that the values of power consumption are estimates based on the circuit size.

The mean power consumption of the circuit of FIG. 3 was calculated with the proportion of time that each of the detectors 6a and 6b is selected being ½. As can be seen from this table, in each of the individual detectors 6a and 6b, by performing a simplified design suited to each of the systems, it is possible to achieve a reduction in the size of the circuits. By simplifying and reducing the circuit size and by stopping operation of a non-selected circuit, with a detection circuit of a magnetic recording and playback apparatus according to the first embodiment, it is possible to achieve a great reduction in power consumption.

Figure 6A:
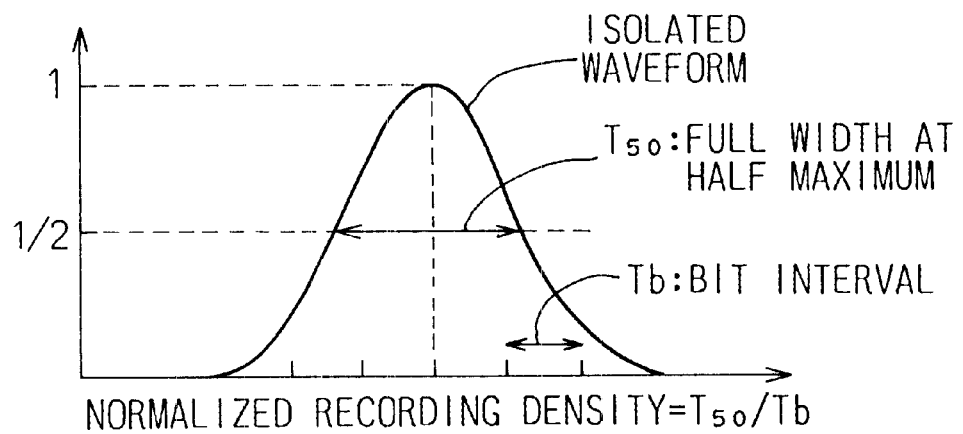
FIG. 6A is a drawing which illustrates the definition of normalized recording density.
Figure 6B:
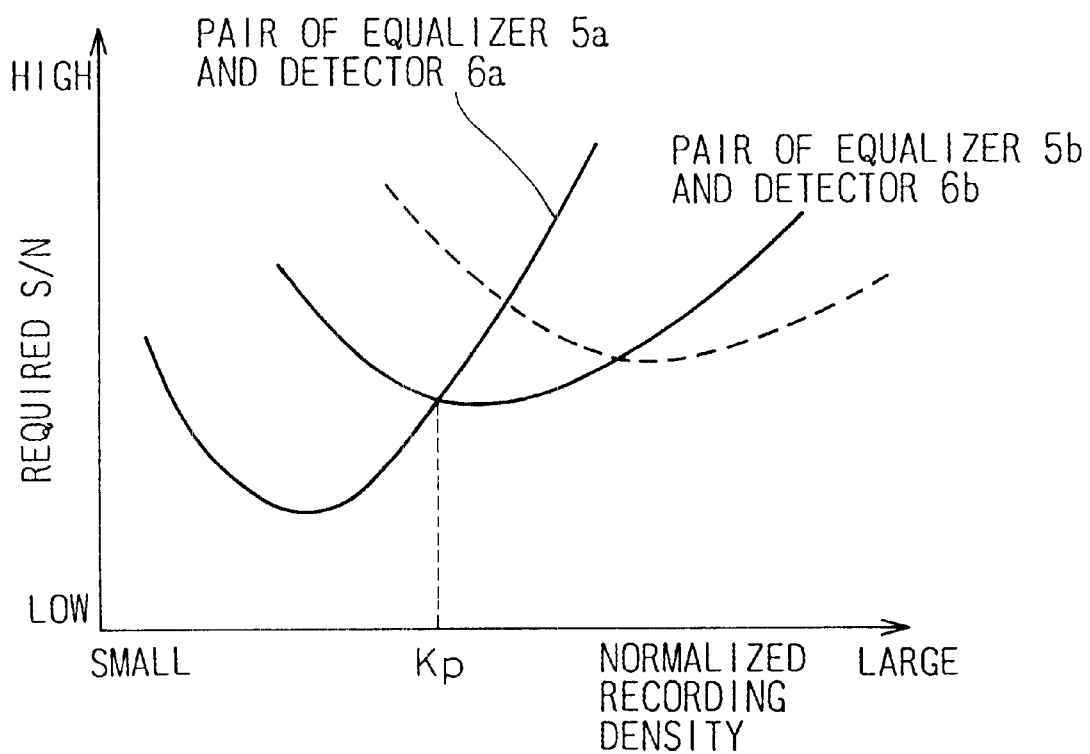
FIG. 6B is a drawing which shows characteristics indicating the SIR required with respect to normalized recording density for PR4ML and EPR4ML.

FIG. 6A illustrates the definition of normalized recording density, while FIG. 6B shows the characteristics of equalization and detection in the PR4ML and EPR4ML systems, the horizontal axis representing normalized recording density, and the vertical axis representing the required S/N ratio. The normalized recording density, as shown in FIG. 6A, is expressed as the ratio $T_{50}/T_b$ of the full width at half maximum $T_{50}$ to the data bit interval $T_b$ of an isolated waveform (under the conditions of playback by a head of only one magnetization reversal, with no interference from other reversals). The required S/N, shown along the vertical axis, is the S/N ratio that is required in equalization and the detector to achieve a given error rate (for example, $10^{-9}$).

Therefore, in the case of FIG. 6B, it can be seen that at a normalized recording density below the normalized recording density line of $K_p$, the characteristics of the combination of equalizer 5a and detector 6a shown in FIG. 3 are good, and at a normalized recording density above this line the characteristics of the combination of equalizer 5b and detector 6b are superior. Thus, if the combination of equalizer 5a and detector 6a is switched with the combination of equalizer 5b and detector 6b with this normalized recording density $K_p$ as a boundary point for switching, it is possible to minimize the required S/N ratio. The broken line shown in FIG. 6B shows the normalized recording density and the required S/N ratio in the case in which yet another combination of equalizer and detector is provided.

Figure 7A:
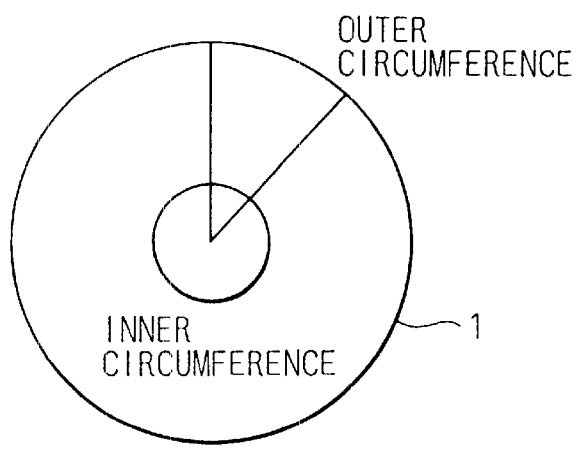
FIG. 7A is a drawing which illustrates the radial positions of the inner circumference and the outer circumference of a magnetic disk.

In the case in which the transmission speed of the magnetic disk apparatus is kept constant, as shown in FIG. 7A,

TABLE 1

| SYSTEM | | CIRCUIT SIZE (NUMBER OF GATES) | POWER CONSUMPTION |
|---|---|---|---|
| PRIOR ART | (VITERBI ALGORITHM) | 20,950 | 0.75 W |
| PRESENT INVENTION | PR4ML (FERGUSON ALGORITHM) | 1,193 | 0.02 w |
| | EPR4ML (KNUDSON ALGORITHM) | 4,655 | 0.17 w |
| | SUM OF GATES AVERAGE POWER CONSUMPTION | 5,848 | 0.1 W |

Note: 1.2 μW/gate/MHz, 100 Mb/s, operating ratio: 30%

In the PR4ML system, there is the case in which a simple application is made of the Viterbi detector, such as shown in "Optimal Reception for Binary Partial Response Channels." M. J. Ferguson, The Bell System Technical Journal, Vol. 51, No. 2, February 1972. In addition, in this simple method of application, because detection is possible by dividing the signal is into two sequences, skipping every other one, the internal circuit processing speed was calculated to be 50 Mb/s.

Figure 7B:
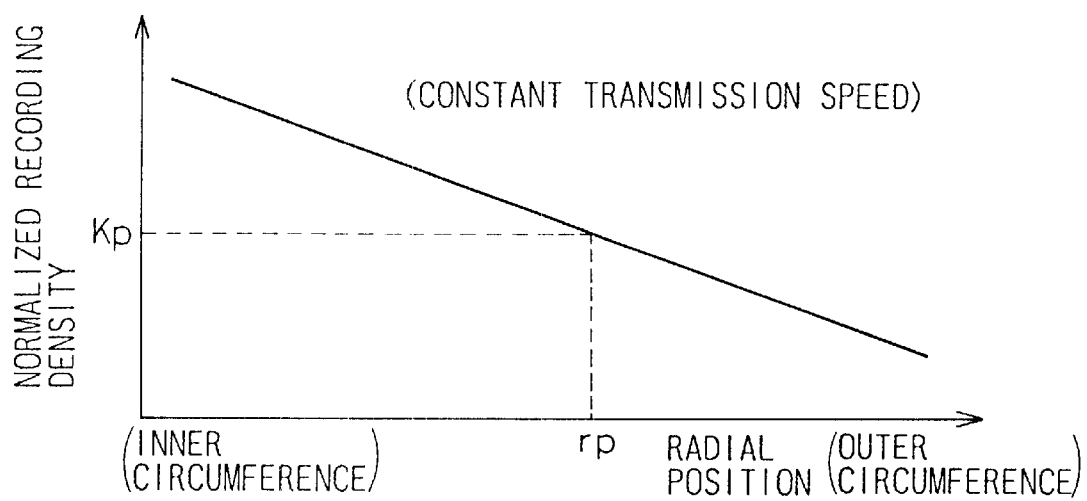
FIG. 7B is a drawing which shows the characteristics indicating the normalized recording density with respect to the radial position in FIG. 7A.

In the EPR4ML system, there is a simple method of application as shown in "Dynamic Threshold Implementation of the Maximum-Likelihood Detector for the EPR4 Channel," Kelly J. Knudson, G LOBECOME '91, 60B.1.1, pp. 2135–2139, 1991.

at the inner circumference and at the outer circumference of the disk 1, the length of the recording of a given amount of data is different. Therefore, as shown in FIG. 7B, the normalized recording density is large at the inner circumference of the disk 1 and small at the outer circumference. Because of this, the combination of equalizer 5b and detector 6b are selected inside the boundary radial position $r_p$ (track position), and the combination of equalizer 5a and detector 6a are selected outside the boundary radial position $r_p$. The recognition of the radial position (track position) is easily done by using the track information from the disk control circuit.

Figure 8A:
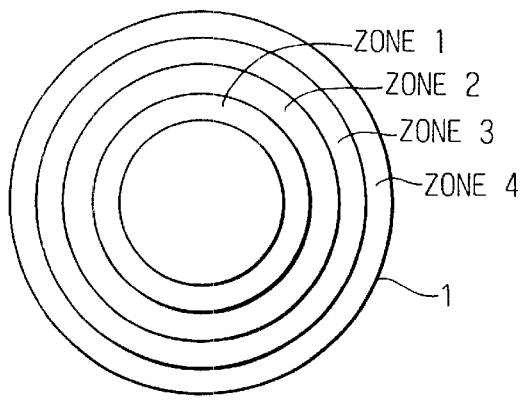
FIG. 8A is a drawing which illustrates radial positions and zone separations in a magnetic disk which uses zone bit recording.
Figure 8B:
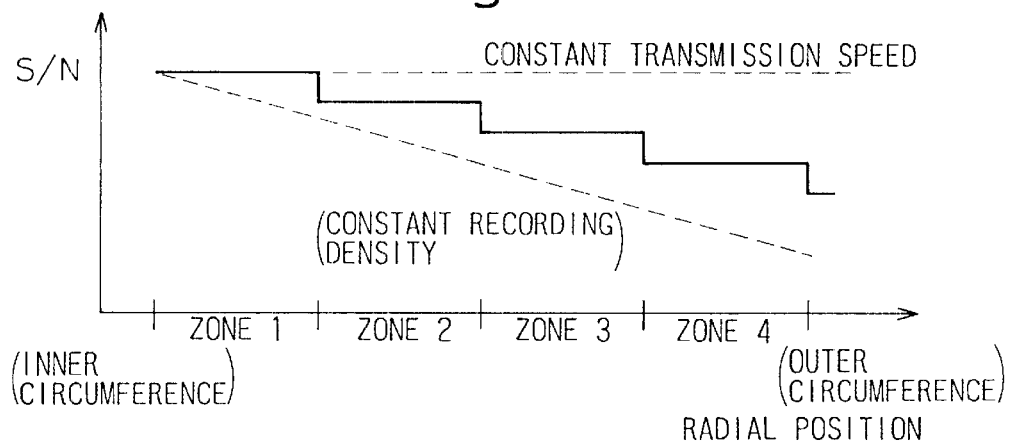
FIG. 8B is a drawing which shows the variation of the S/N with respect to the radial position in FIG. 8A.

Recently, there has been increasing use of zone bit recording (ZBR), for the purpose of increasing the recording capacity. In ZBR, as shown in FIG. 8A, the disk is divided into a number of zones, the transmission speed in each of which differs. As shown by the broken lines in FIG. 8B, if the data recording density is held constant, the S/N is reduced as the position moves toward the outer circumference. This is because the transmission speed increases, causing a broadening in bandwidth. For this reason, if the S/N ratio is reduced somewhat and the transmission speed is switched for each zone, the S/N ratio is as shown by the solid line in FIG. 8B. The normalized recording density under these conditions is shown in FIG. 8C.

Figure 8C:
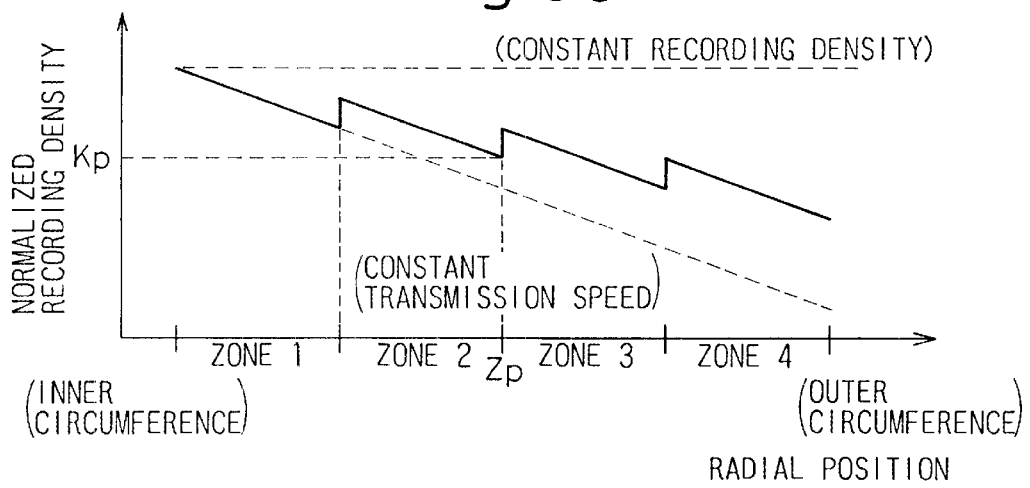
FIG. 8C is a drawing which shows the value of normalized recording density with respect to radial position in FIG. 8A.

Because of this, the combination of equalizer 5b and detector 6b are selected inside the zone switching point of $Z_P$, which corresponds to the normalized recording density $k_P$ in FIG. 8C, and the combination of equalizer 5a and detector 6a are selected outside this zone switching point. In this case as well, the recognition of the zone is easily done by using the track information from the disk control circuit.

Figure 9:
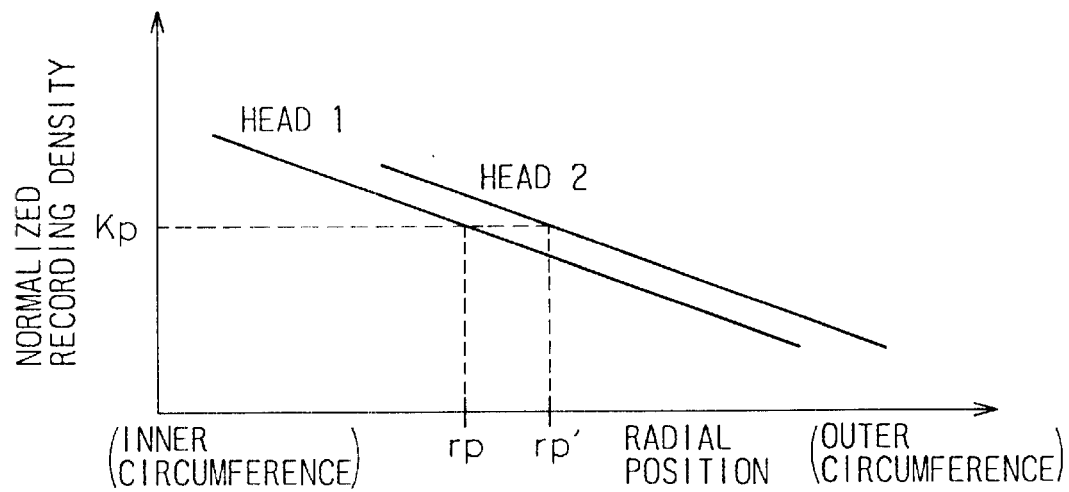
FIG. 9 is a drawing which shows the variation in normalized recording density due to head variations in a magnetic recording and playback apparatus having a plurality of disks.
Figure 10:
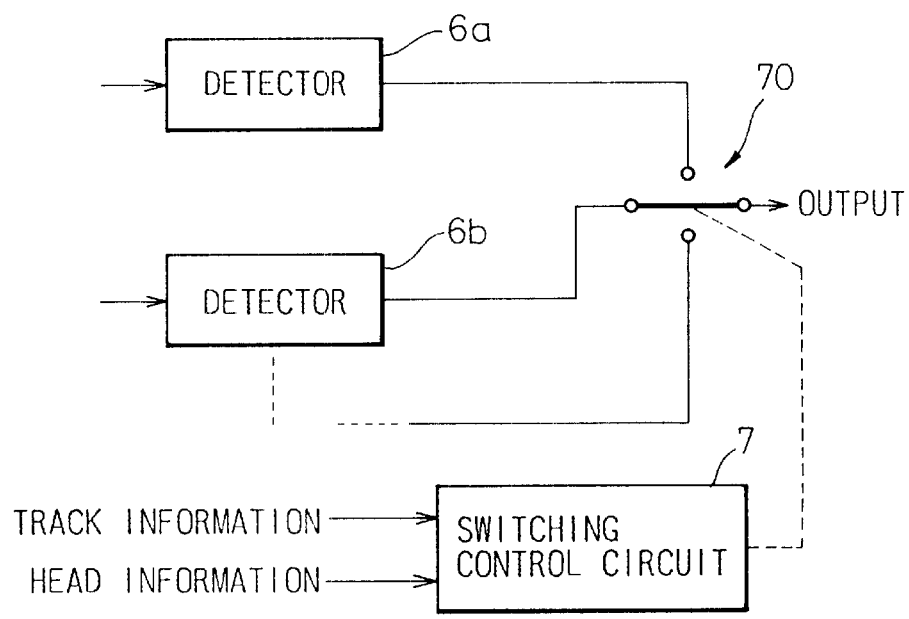
FIG. 10 is a block diagram which shows the configuration of a switching circuit to handle the variation in head characteristics shown in FIG. 9.

In addition, the normalized recording density varies not only with respect to the full width at half maximum value (track width) and the transmission speed, but also with respect to the head characteristics. FIG. 9 shows the change in normalized recording density with head variations. Therefore, for switching at a given normalized recording density $k_P$, the actual full width at half maximum point at which switching is done will vary. Because of this, the full width at half maximum of the head is measured beforehand, the switching positions $r_p$ (track position) and $r_p'$ shown in FIG. 9 being stored in the switching control circuit 7. Then, if a method is employed that generates the switching signal from the track information and the head information stored in the switching control circuit 7, this problem is solved.

While the above discusses only normalized recording density as a criterion for switching, the switching conditions change also with other aspects of the environment. For example, compared with extended class 4 (EPR4ML), class 4 (PR4ML) enables high-speed operation. Thus, it is possible to have a system in which when performing high-speed data transfer, class 4 is used, and when performing low-speed data transfer, extended class 4 is used.

The present invention is not limited to PRML, but can also be applied to such systems as peak detection and Viterbi detectors which use trellis coding as well.

Figure 11:
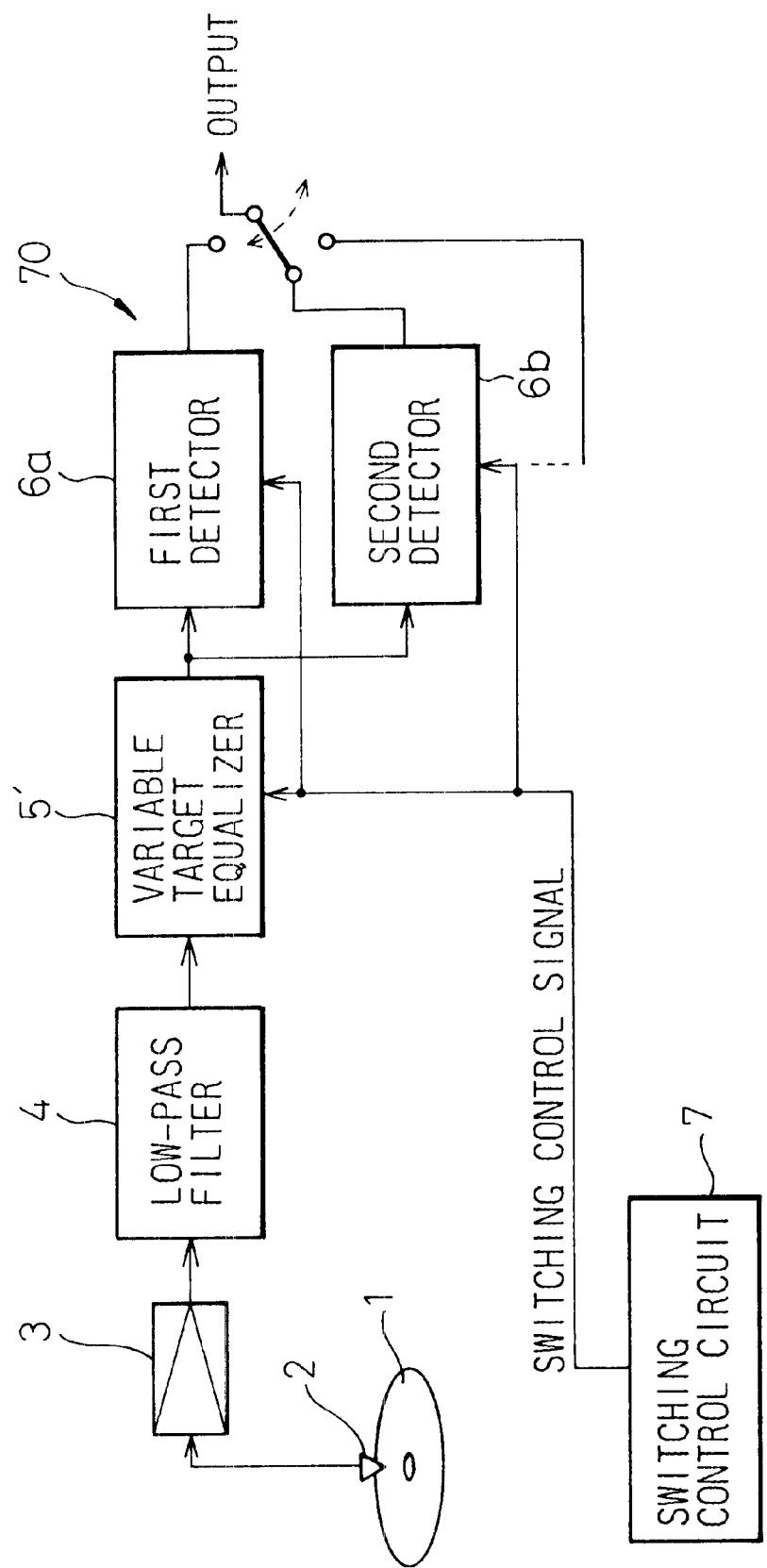
FIG. 11 is a block diagram which shows the configuration of a detecting circuit of a magnetic recording and playback apparatus according to the second embodiment of the present invention.

FIG. 11 shows the configuration of the second embodiment of the present invention. This second embodiment differs from the first embodiment shown in FIG. 3 in that it uses a variable target equalizer 5' as the equalizer. The variable target equalizer 5' is an equalizer that is capable of switching to the desired waveform. For this reason, it is possible to consolidate the plurality of equalizers 5a and 5b shown in FIG. 3 into the variable target equalizer 5'. The first and second detectors 6a and 6b are connected in parallel to the output side of the variable target equalizer 5', the switching of the outputs therefrom being controlled by the switching control circuit 7. Although, to simplify the description, there are two detectors illustrated in the drawing, it is possible to have a larger number of detectors connected to the variable target equalizer 5'.

Figure 12:
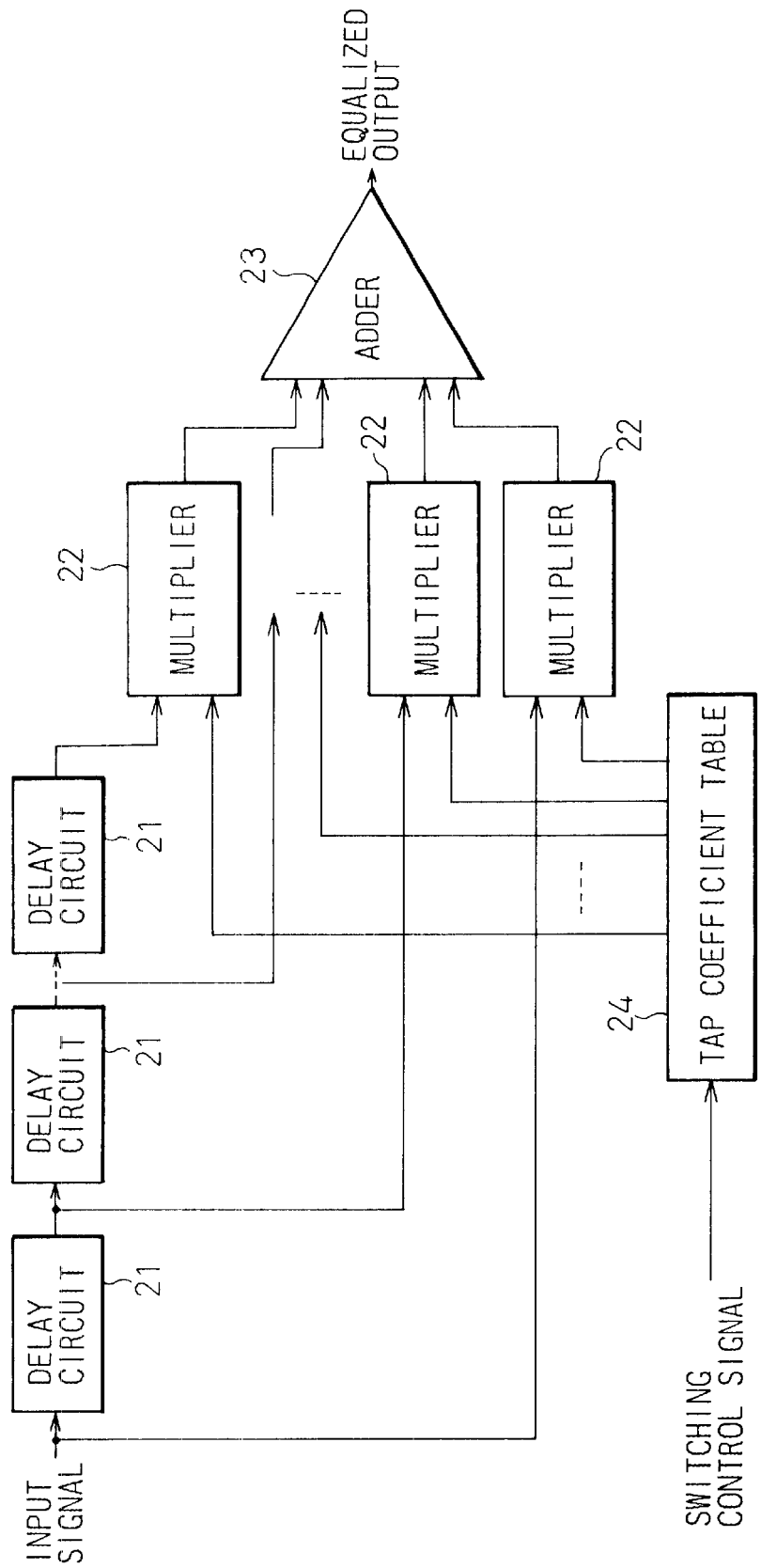
FIG. 12 is a block diagram which shows an embodiment in which the variable target equalizer of FIG. 12 is implemented by a transversal filter.

FIG. 12 shows an embodiment of the variable target equalizer 5' as implemented by a transversal filter. The transversal filter in this embodiment, similar to the general type of transversal filter, has a plurality (for example N ) of delay circuits 21, a plurality (for example N+1) of multipliers 22, and an adder 23. A delay circuit 21 delays the signal by an amount of time equal to the bit interval (sampling interval). The multipliers 22 multiply the delayed signal by the tap coefficients. The adder 23 adds together all the outputs of the multipliers 22.

A tap coefficient table 24 is also provided in this embodiment. This tap coefficient table 24 has stored in it tap coefficients for the equalization to the target waveforms. The tap coefficients from this tap coefficient table 24 are input to multipliers 22, a series of tap coefficients being applied to the multipliers in accordance with a switching control signal from the switching control circuit 7.

Figure 13:
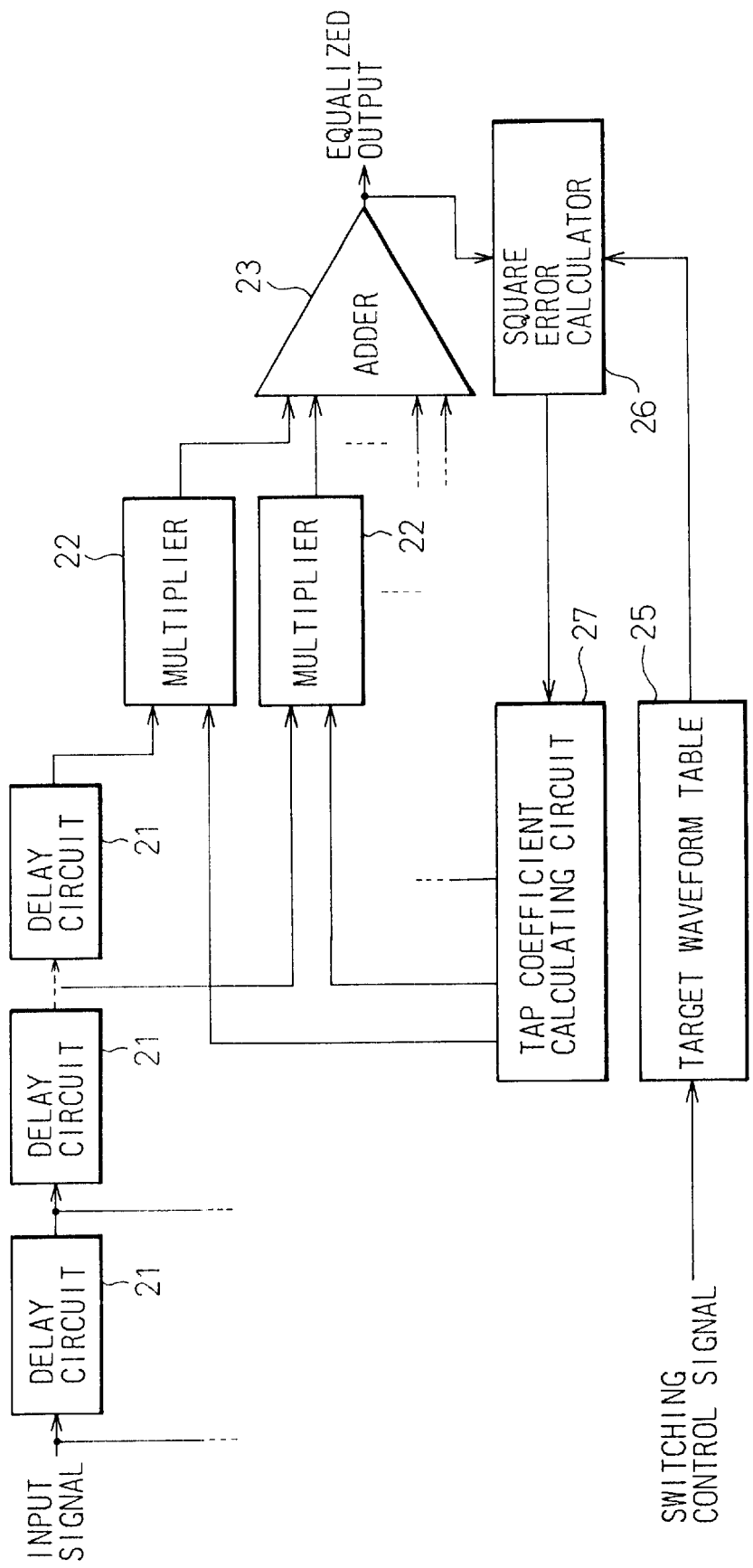
FIG. 13 is a block diagram which shows the configuration in the case in which the variable target equalizer of FIG. 12 is implemented as an adaptive equalizer.

The tap coefficients depend not only upon the target waveform, but also upon the normalized recording density (or strictly speaking, on the isolated waveform). Therefore, it is necessary to measure the isolated waveform beforehand to determine the appropriate corresponding tap coefficients. FIG. 13 shows an embodiment in which the variable target equalizer of FIG. 12 is implemented by means of an adaptive filter. In this embodiment, in place of the tap coefficient table 24, a target waveform table 25, a square error calculator 26, and a tap coefficient calculating circuit 27 are provided. The target waveform table 25 has stored in it the various target waveforms. The square error calculator 26 calculates the square error between the equalized output of the adder 23 and the target waveform from the target waveform table 25, and outputs this to the tap coefficient calculating circuit 27. The tap coefficient calculating circuit 27 calculates the tap coefficients from this waveform and the square error and outputs them to the multipliers 22. In this way, the multipliers 22, the adder 23, the square error calculator 26 and the tap coefficient calculating circuit 27 form a closed loop. Therefore, by means of a switching signal from the switching control circuit 7 shown in FIG. 11, the target waveform output from the target waveform table 25 is switched, enabling equalization to the desired waveform.

The inventors of the present invention have demonstrated a method for performing equalization in which, in a waveform equalizer which performs partial response $(1+D)^n$ equalization, with D as the 1-bit interval, the equalizer is divided into a pre-equalizer and a post-equalizer, the pre-equalizer performing $(1+D)$ equalization and the post-equalizer then performing $(1+D)^{n-1}$ equalization (Unexamined Patent Publication (Kokai) No. 6-29785). In accordance with this method, not only is the equalization control configuration simplified but the clock signal extraction is facilitated as well.

Figure 14:
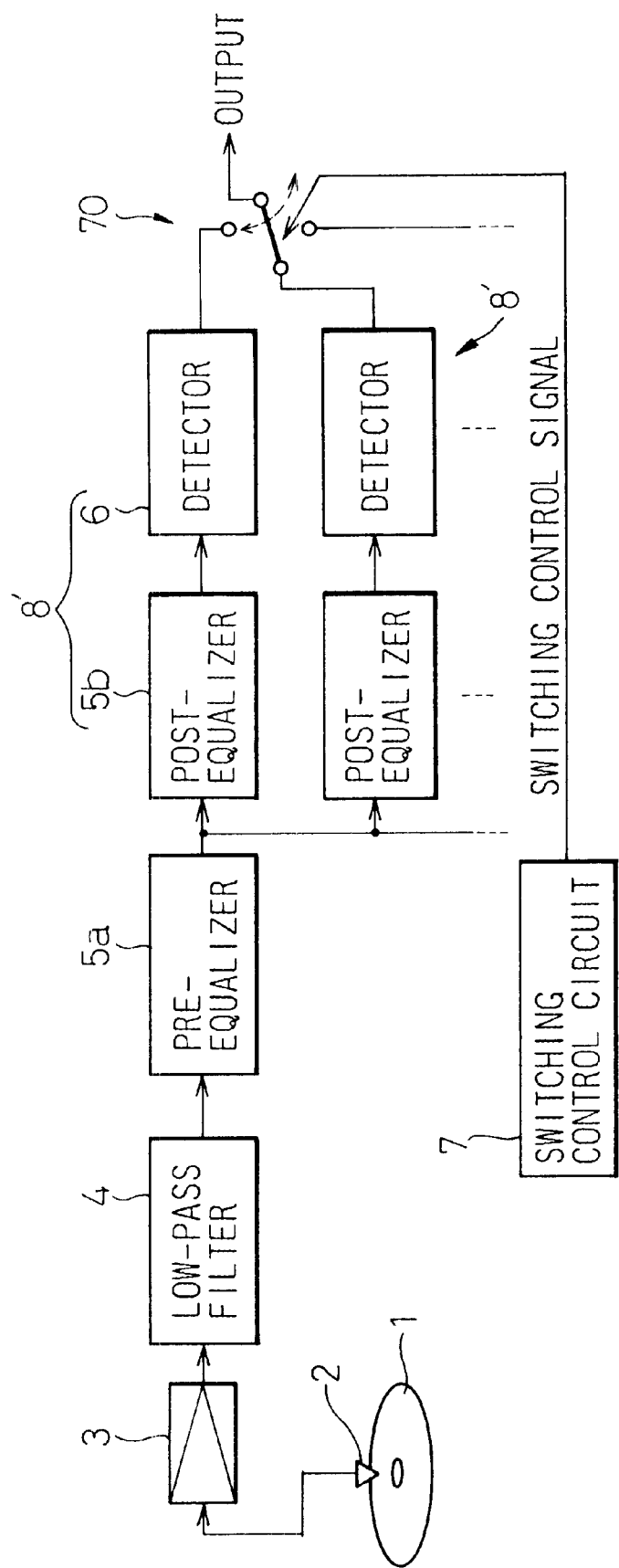
FIG. 14 is a block diagram which shows the configuration of a detection circuit of a magnetic recording and playback apparatus according to the third embodiment of the present invention.

FIG. 14 shows the configuration of a third embodiment of the present invention, in which the method, of the above-noted Unexamined Patent Application Publication, of dividing the equalizer into a pre-equalizer and a post-equalizer is applied. In this embodiment, after the output of one pre-equalizer 5a, a plurality of combinations 8' of post-equalizers 5b and detectors 6 are connected in parallel. The outputs of the detectors of each of the combinations 8' is switched by means of the switch 70 which is switched by means of a switching signal from the switching control circuit 7, so that just one of these outputs is selected. Although it is not shown in the drawing, the operation of the combinations of post-equalizers 5b and detectors 6 which are not selected is stopped.

This configuration of detecting circuit equalizer in a magnetic recording and playback apparatus can be employed in the case when, with R(f) representing the frequency response of the playback signal, the frequency characteristics of the plurality of equalization target waveforms can be expressed as $G(f)*Hi(f)$ (where i=1, 2, 3, . . . , n). Under these condition, the configuration is established so that the above-noted pre-equalizer 5a has the response G(f)/R(f), and so that the post-equalizer 5b has the response Hi(f) (where i=1, 2, 3, . . . , n).

In this embodiment, the pre-equalizer 5a is provided with a function that eliminates excessive interference in the playback signal. To do this, it is possible to configure the post-equalizer 5b by only delay circuits and an adder. By consolidating the pre-equalizer 5a, which can become large, into a single equalizer, it is possible to simplify the overall equalizer.

Figure 15:
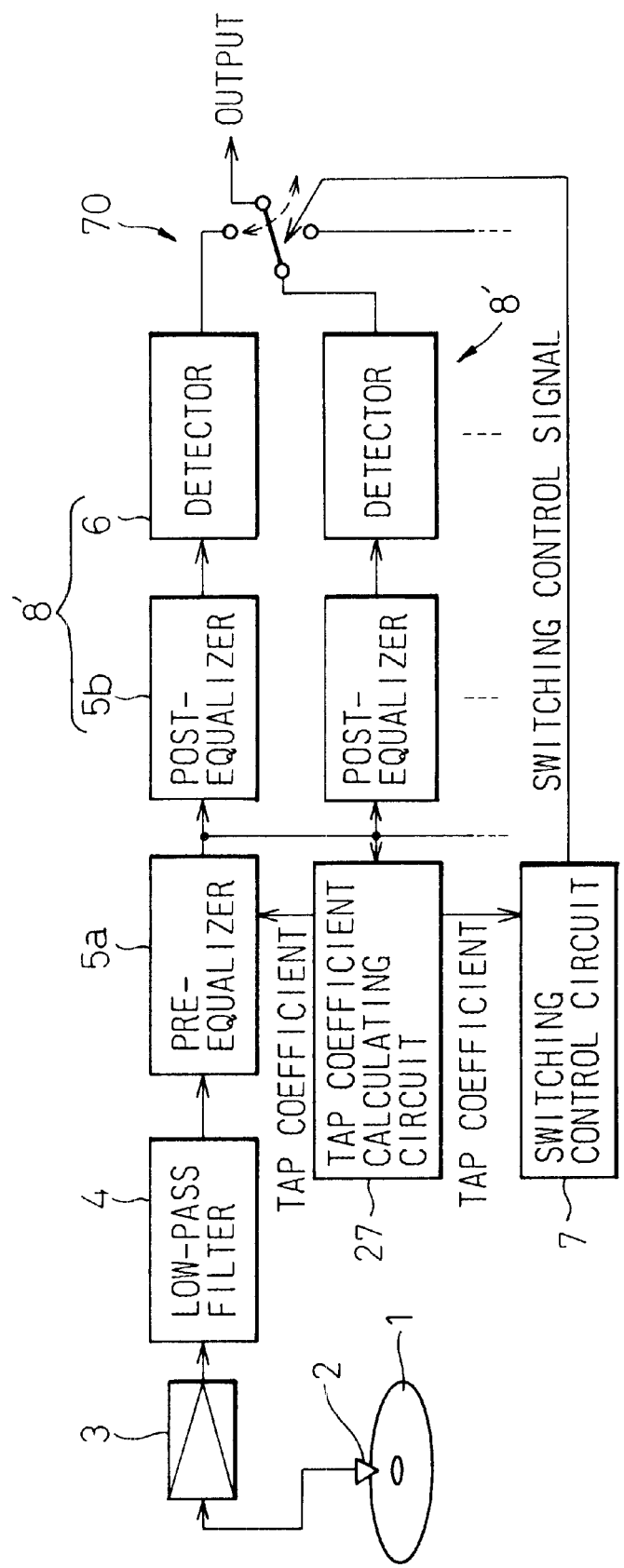
FIG. 15 is a block diagram which shows the configuration of a variation of a detection circuit of a magnetic recording and playback apparatus according to the third embodiment of the present invention.

FIG. 15 shows a variation of an embodiment of a detection circuit for a magnetic recording and playback apparatus according to the third embodiment of the present invention shown in FIG. 14, in which the above-noted pre-equalizer 5a is implemented as an adaptive filter. In this embodiment, a tap coefficient calculating circuit 27, to which is input the signal from the pre-equalizer 5a, is provided. The tap coefficients calculated by the tap coefficient calculating circuit 27 are input to the pre-equalizer 5a and to the switching control circuit 7. As can be seen from this configuration, in this embodiment, this is a system in which the value of the normalized recording density is predicted from the converged tap coefficient values, the switching control circuit 7 selecting from the combinations 8' of post-equalizer 5b and detector 6.

Figure 16:
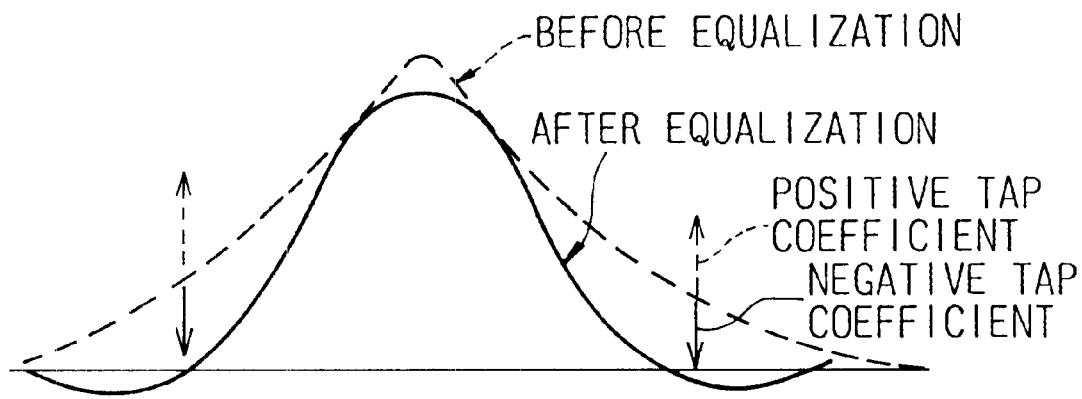
FIG. 16 is a isolated waveform drawing which illustrates simply the principle of the system of FIG. 15.
Figure 17:
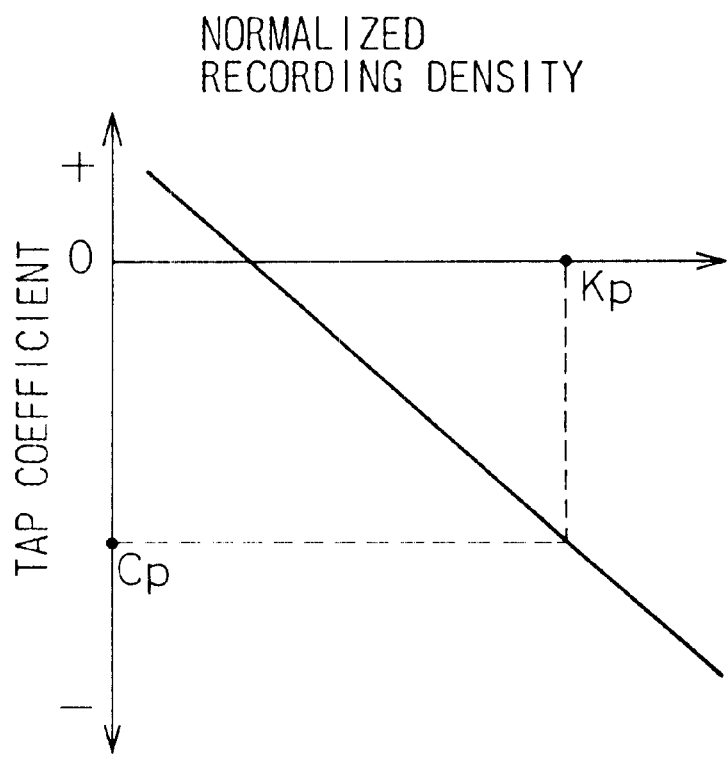
FIG. 17 is a drawing which shows the relationship of the tap coefficient to the normalized recording density in the embodiment of FIG. 15.

FIG. 16 will be used to provide a simple description of the method shown in FIG. 15. The broken line shown in FIG. 16 indicates the isolated waveform before equalization, and the solid line indicates the isolated waveform after equalization. If the equalizer is assumed to have three taps, the overall gain is adjusted by the middle tap, and excessive interference is eliminated by the taps on either side of this center tap. If the amount of interference is large, the amount removed becomes large, so that the values for the two side taps become large in the negative direction. FIG. 17 shows the relationship of the normalized recording density an the tap coefficients under these conditions. For a normalized recording density of $K_p$, if the two side tap coefficients are $C_p$, looking at the tap coefficient $C_p$ it is possible to see what the normalized recording density $K_p$ is. This is because there is a correspondence between the tap coefficient $C_p$ and the normalized recording density $K_p$. Therefore, it is desirable to switch the combinations of equalizers and detectors using this tap coefficient $C_p$ as the switching boundary point. Although the number of taps in an actual equalizer is larger than three, and it is difficult to consider all the tap coefficients, if we focus on the taps that have a large influence (that is, that are highly sensitive to the normalized recording density), it possible to easily switch the combinations of equalizers and detectors.

Figure 18:
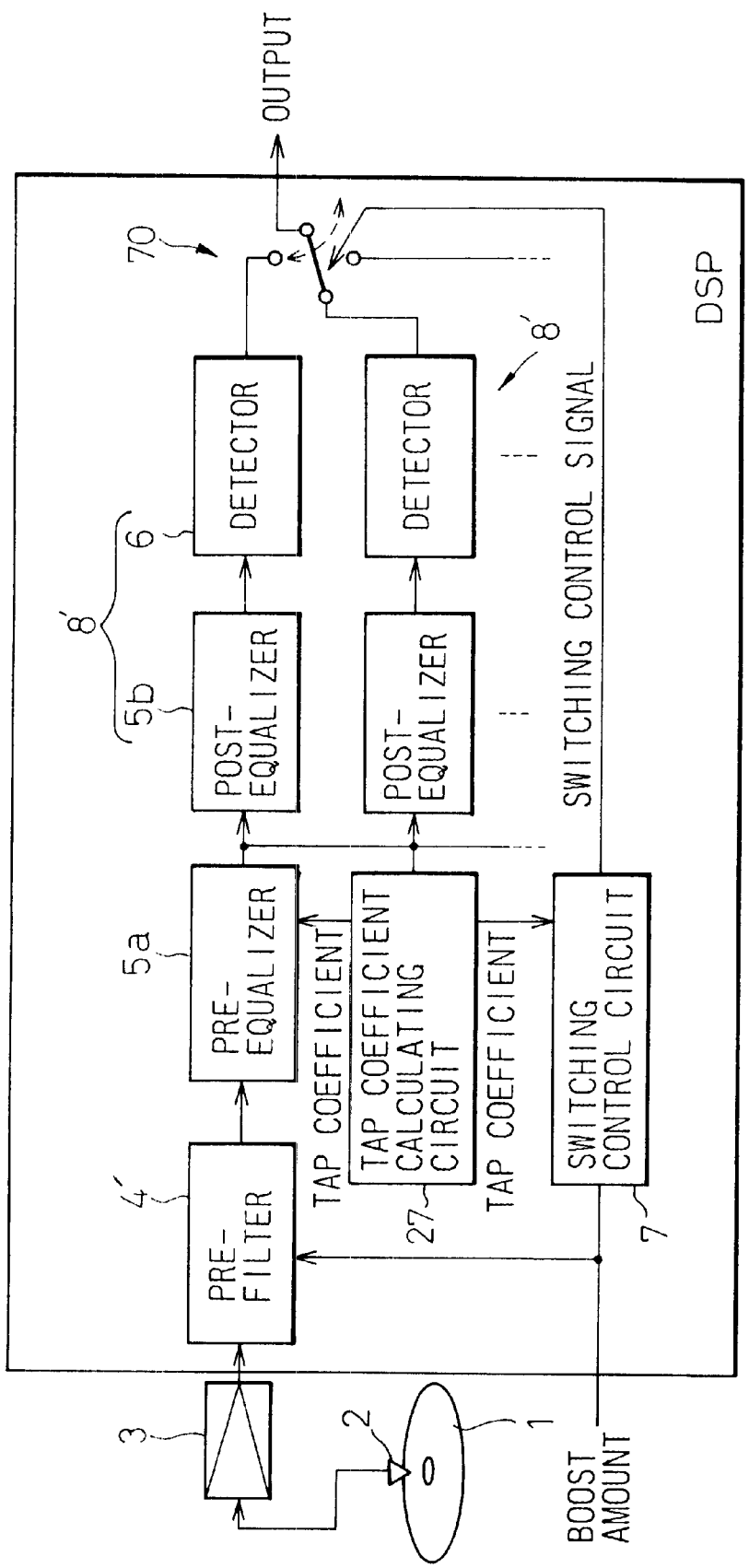
FIG. 18 is a block diagram which shows the configuration of a detection circuit of a magnetic recording and playback apparatus according to a different form of the third embodiment of the present invention.

FIG. 18 shows the configuration of a detection circuit for a different variation of the embodiment shown in FIG. 15. In this embodiment, a pre-filter 4', having a boost function (emphasis function) is used as the low-pass filter 4. Therefore, in this embodiment, the only difference with respect to the configuration of the embodiment of FIG. 15 is that the boost amount is applied to the above-noted pre-filter 4' and to the switching control circuit 7. Constitutional elements that are the same as in FIG. 15 have, therefore, been assigned the same reference numerals as in FIG. 15. It is also possible to implement the pre-filter 4', the pre-equalizer 5a, the post-equalizers 5b, the detectors 6, the switching control circuit 7, the tap coefficient calculating circuit 27, and the switch 70 of this embodiment as a single integrated circuit.

Figure 19:
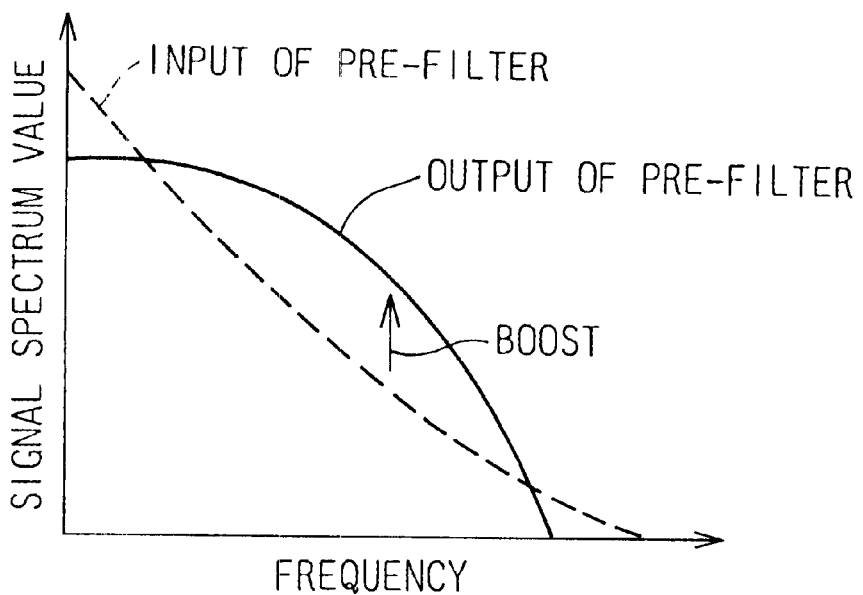
FIG. 19 is a drawing which shows the input-output characteristic of the filter when boost is applied in the embodiment of FIG. 18.
Figure 20:
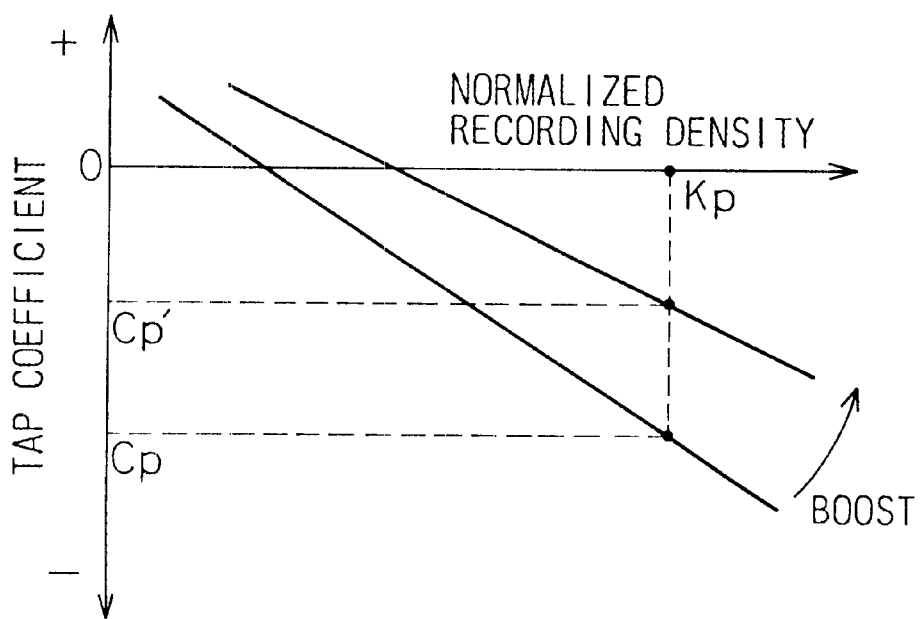
FIG. 20 is a drawing which shows the relationship between the normalized recording density and the tap coefficient when boost is applied.

FIG. 19 shows the boost function as viewed in terms of the frequency response, the horizontal axis representing frequency, and the vertical axis representing the signal spectral magnitude. The high-end spectrum of the input signal is emphasized, so that an equivalent elimination of the interference component shown on the time-axis in FIG. 16 is achieved. Therefore, when there is boost, the relationship of the normalized recording density to the tap coefficient is as shown in FIG. 20. For this reason, the tap coefficient values $C_p$ and $C_{p'}$, which perform switching of the combinations 8' of post-equalizers 5b and detectors 6 in response to whether or not there is boost and to the magnitude thereof, are held in a table at the switching control circuit 7 of FIG. 18. The switching of the combinations 8' of post-equalizers 5b and detectors 6 is then done, based on whether or not there is boost and on the magnitude thereof.

Figure 21:
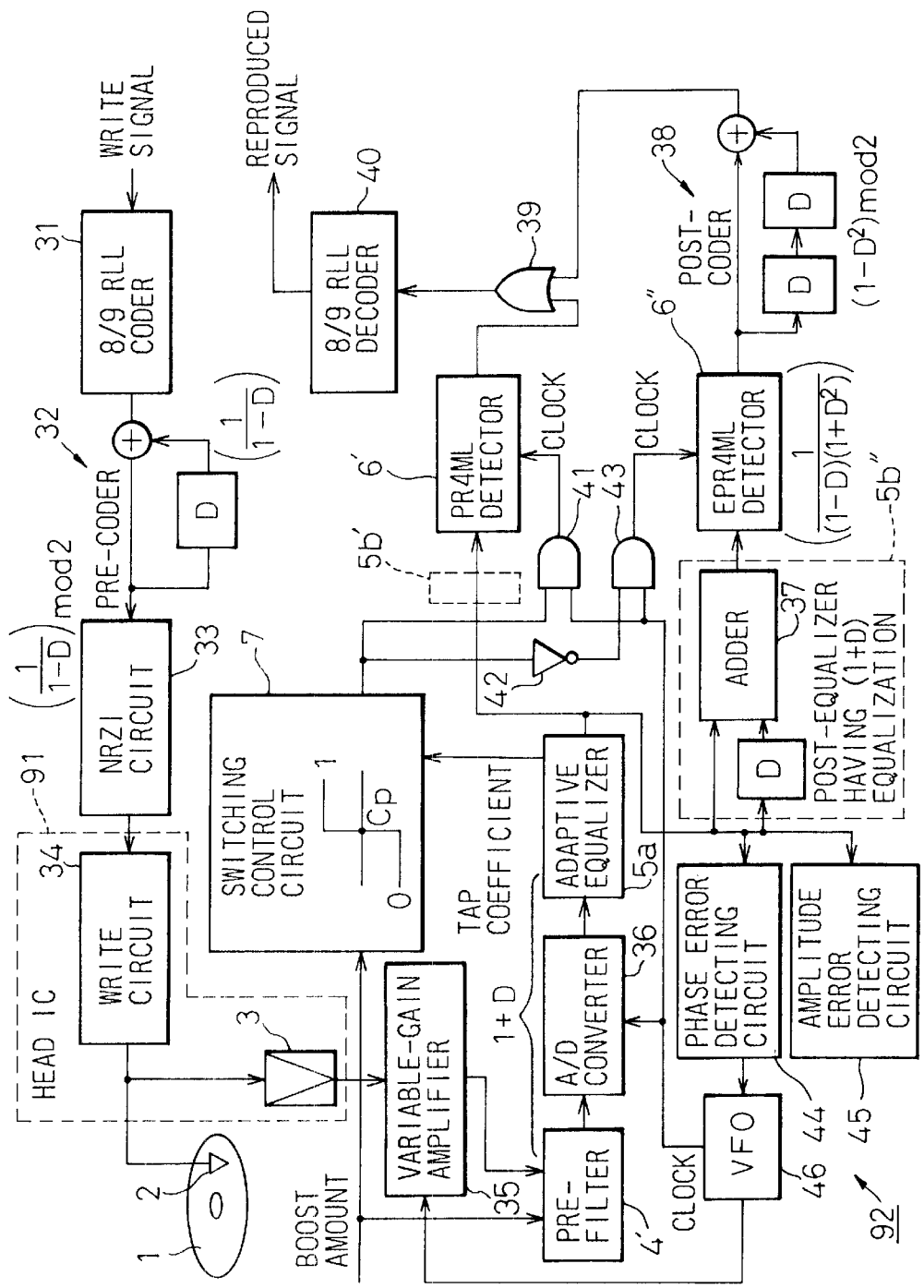
FIG. 21 is a drawing which shows a detailed circuit configuration for an embodiment of the circuit of FIG. 18.

FIG. 21 shows the circuit configuration of a specific embodiment of a magnetic disk apparatus in which PR4ML and EPR4ML switching is done when performing magnetic recording and playback. This drawing shows the head IC 91 from the prior art and the specific circuit configuration of the present invention for the read/write circuit 92. The write signal passes through an 8/9 RLL coder 31, a pre-coder 32, a NRZI circuit 33, and a write circuit 34 which is inside the head IC 91, and is written onto the magnetic disk 1.

The signal which is read out by means of the head 2 from the magnetic disk 1 (that is, the playback signal) is amplified by the amplifier 3 in the head IC 91 and by the variable-gain amplifier 35, after which it is input to the pre-filter 4'. The output of the pre-filter 4' is passed through an A/D converter 36, and input to an adaptive equalizer (pre-equalizer) 5a. The output of the adaptive equalizer 5a is input to the post-equalizers 5b' and 5b", to the phase error detecting circuit 44, and to the amplitude error detecting circuit 45. The output of the phase error detecting circuit 44 is input to the VFO (variable-frequency oscillator) 46, and the output of the amplitude error detecting circuit 45 is input to the variable-gain amplifier 35.

In this embodiment, the post-equalizer 5b' performs (1+D) equalization by means of the adder 37 and a 1-symbol delay element D, the result being input to the EPR4ML detector 6". The post-equalizer 5b' inputs the output of the adaptive equalizer 5a directly to the PR4ML detector 6'. The output of the PR4ML detector 6' is directly input to the OR circuit 49, while the output of the EPR4ML detector 6" is input to the OR circuit 39 via the post-coder 38. The output of the OR circuit 39 is passed through the 8/9 decoder 40 and is output from the read/write circuit 92 as the playback signal.

The amount of boost from the control circuit (not shown in the drawing) is input to the pre-filter 4' and to the switching control circuit 7. The tap coefficients are input to the switching control circuit 7 from the adaptive equalizer 5a. The adaptive equalizer 5a outputs "1" if the tap coefficient is greater than $C_p$ and outputs "0" if the tap coefficient is equal to or less than $C_p$. The output of the switching control circuit 7 is input to the AND circuit 41 as a gate signal, and also inverted by the inverter 42 and input as a gate signal to the AND gate 43. The other inputs of the AND circuit 41 and 43 have the clock from the VFO (variable-frequency oscillator) 46 applied to them. Therefore, when the output from the switching control circuit 7 is "1", the clock passes through the AND circuit 41 and is input to the PR4ML detector 6', and when the output from the switching control circuit 7 is "0", the clock passes through the AND circuit 43 and is input to the EPR4ML detector 6". The detector to which the clock is input operates and the operation of the detector to which the clock is not applied stops.

In a detection circuit of an embodiment configured such as shown in FIG. 21, by means of the switching control signal from the switching control circuit 7, the clocks to the PR4ML detector 6' and to the EPR4ML detector 6" are gated at the AND circuits 41 and 43, respectively. The functioning of the detector which is not selected by an output from the AND circuit 41 or 43 is stopped, the output therefrom being fixed at 0 level. The output from either the PR4ML detector 6' or the EPR4ML detector 6" passes through the OR circuit 39 and is output to the 8/9 RLL coder 40. In this manner, in an embodiment such as shown in FIG. 21, a function is implemented that is the same as if the detector output is selected by the switching control circuit 7. When these detectors 6' and 6" are implemented using the CMOS process, the above-noted detector circuit which is not selected consumes no power.

The switching control circuit 7 in this embodiment compares the tap coefficient of the adaptive equalizer 5a and the tap coefficient reference $C_p$ in outputting a switching control signal. However, the switching control signal is held during a given series of data, and changes at the point at which the training region of the adaptive equalizer 5a ends or at which the tap coefficient stabilizes. The reference $C_p$ is varied in response to the amount of boost to the pre-filter 4'.

Further, in this embodiment, (1+D) equalization is performed by means of the pre-filter 4' and the adaptive equalizer 5a. That is, the output from the adaptive equalizer 5a is a PR4 waveform. In contrast to the PR4 waveform, which is a 3-level signal, the EPR4 waveform is a 5-level signal. Because of this, the post-equalizer 5" for the purpose of EPR4 equalization is formed by a D delay circuit and an adder 37. By configuring this post-equalizer 5" for the purpose of EPR4 equalization as a two-stage device, because the equalization, phase error detection, and amplitude error detection are performed on a PR4 signal, it is possible to simplify the circuit.

Furthermore, the equalizer and the method of performing switching are not limited to the method of this embodiment, but can be applications of any of the above-described methods.

With 8/9 (0, K/L) RLL (run-length limited) coding, coding which considers not only a limit of K continuous 0s but also a limit of L continuous 0s in the cases of a alternating odd or even stream of 8/9 RLL symbols is given in the following cited literature. The object of alternating to obtain an odd and an even steam is to shorten the path memory length of the PR4ML detector.

(1) "Method and Apparatus for Implementing Optimum PRML Codes", J. S. Eggenberger and A. M. Patel, U.S. Pat. No. 4,707,681, November 1987

(2) "Method and Apparatus for Implementing a PRML Code", B. H. Marcus and A. M. Patel and P. H. Siegel, U.S. Pat. No. 4,786,890, November 1988

The pre-coder 32 shown in FIG. 21 is provided for the purpose of making the output of the 8/9 RLL coder 31 equal to the continuous 0 limit of the PR4ML detector 6' input (that is, to make the transfer function 1 when represented by D).

Figure 22:
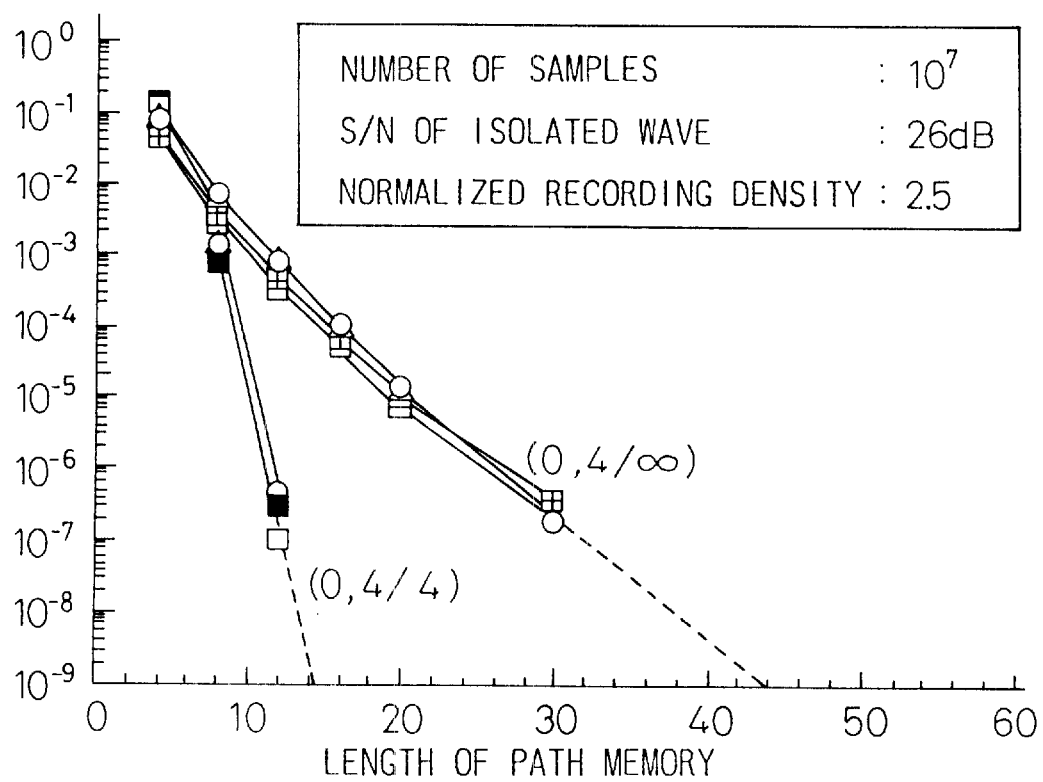
FIG. 22 is a drawing which shows the relationship of the path memory length and the bit error rate of the EPR4ML detector comparing the usage of a 8/9 (0, 4/∞) code and a 8/9 (0, 4/4) code.

FIG. 22 shows the relationship of the path memory length and the bit error rate (B.E.R.) of the EPR4ML detector comparing the usage of a 8/9 (0, 4/∞) code and a 8/9 (0, 4/4) code. When the 8/9 (0, 4/∞) code having no limitation of continuous 0s in the cases of an alternating odd and even stream is used, it is necessary to have a path memory of 40 or more stages. Contrary to this, when the 8/9 (0, 4/4) code having a limitation of continuous 0s in the cases of an alternating odd and even stream in order to be used for PR4ML is used, the number of path memory stages for a B.E.R. is only 15 stages. In this way, the usage of 8/9 (0, 4/4) code can make the length of the path memory less than half value as compared with the usage of 8/9 (0, 4/∞) code.

In implementing an actual circuit for the above-described system, by consolidating a plurality of equalizers and detectors into a single integrated circuit, so that this integrated circuit can be treated from the outside as a single equalizer and detector, the wiring to other circuits is simplified. The implementation as an integrated circuit is advantage, in consideration of the connections to other systems.

As described above, according to the present invention, because it is possible to perform optimum equalization and detection with respect to the normalized recording density seen in a magnetic disk apparatus, it is possible to reduce the required S/N ratio. Also, because at least the detector is provided separately for the target waveforms, compared to the case in which both an equalizer and a detector are used, the size of the circuit is reduced. In addition, by stopping the operation of unnecessary circuits from among the independent equalizers and detectors, it is possible to limit the increase in the power consumption.

Therefore, it is possible to improve the reliability of the playback data read out from the apparatus, thereby enabling an improvement in the recording density and contributing to the high reliability of the recording apparatus.

What is claimed is:

1. A detection circuit, in a magnetic recording and playback apparatus, in which data which is recorded on a magnetic recording medium by a head is read out, said read out data being detected by said detection circuit to obtain the original data, said detection circuit comprising:

an amplifier circuit which amplifies a signal from a head;

a low-pass filter which passes only low-frequency components of said amplified signal;

a plurality of circuits connected in parallel to the output of said low-pass filter, each said circuit connected in parallel being formed by an equalizer provided to perform equalization to a different target waveform, and a detector connected in series with said equalizer to detect the different target waveforms in accordance with the equalized waveform output from said equalizer;

a switching means which is connected to said plurality of circuits formed by combinations of said plurality of equalizers and detectors, and which selects one of the outputs of each of said circuits as the output of said detection circuit, depending on characteristics of the target waveform for data being read out by the head, said switching means selecting said target waveform before said plurality of circuits connected in parallel have completed their operations; and a switching control means which controls the switching action of said switching circuit.

2. A detection circuit according to claim 1, wherein said switching control means stops the operation of nonselected circuits of said plurality of circuits connected in parallel including said equalizer and said detector which is not selected so that said nonselected circuits do not consume power.

3. A detection circuit according to claim 1, wherein said switching control means switches said switching circuit in response to the normalized recording density of the signal read out from said head.

4. A detection circuit according to claim 3, wherein said switching control means switches said switching circuit in response to the radial position or track position of said head over said magnetic recording medium.

5. A detection circuit according to claim 1, wherein data is recorded on said magnetic recording medium using zone bit recording, and wherein said switching control means switches said switching circuit based on the recording frequency included on the signal read out from said head and the bit density zone information, or based on track information.

6. A detection circuit according to claim 1, wherein said switching control means switches and switching means in response to data received from the head by reading a training pattern.

7. A detection circuit in a magnetic recording and playback apparatus in which data which is recorded on a magnetic recording medium by a head is read out, said read out data being detected by said detection circuit to obtain the original data, said detection circuit comprising:
   an amplifier circuit which amplifies a signal from a head;
   a low-pass filter which passes only low-frequency components of said amplified signal;
   a variable target equalizer which is connected to the output side of said low-pass filter, and which is capable of generating equalization waveforms of two or more different types of characteristics;
   a plurality of detectors which are connected in parallel to the output of said variable target equalizer to detect the different target waveforms, in accordance with the equalized waveforms output from said variable target equalizer;
   a switching circuit which is connected to said plurality of detectors, and which selects one of the outputs of each of said detectors as the output of said detection circuit depending on the characteristics of the target waveform for data being read out by the head, said switching circuit selecting said target waveform before said plurality of circuits connected in parallel have completed their operations; and
   a switching control means which controls the switching action of said switching circuit.

8. A detection circuit according to claim 7, wherein said variable target equalizer is formed by a transversal filter which includes a plurality of delay circuits, a plurality of multipliers, and an adder.

9. A detection circuit according to claim 8, wherein said transversal filter is provided with a tap coefficient storage means for storing tap coefficients as equalization setting values for generating said equalization waveforms of two or more different types of characteristics, the tap coefficients of said tap coefficient storage means being selected by a switching control means.

10. A detection circuit according to claim 7, wherein said variable target equalizer is formed by a closed-loop type adaptive equalizer, said closed-loop adaptive equalizer comprising:
   a plurality of delay circuits;
   a plurality of multipliers;
   an adder;
   a target waveform table in which target equalization waveforms are stored;
   a square error calculating circuit which calculates the error or the square error between the output of said equalizer and said target equalization waveform; and
   a tap coefficient calculating circuit which calculates, from the calculated error, tap coefficients as the equalization setting values for generating said equalization waveforms of two or more different types of characteristics;
   said target equalization waveforms which are stored in said target waveform table being selected by said switching control means.

11. A detection circuit according to claim 7, wherein said switching control means switches said switching means in response to data received from the head by reading a training pattern.

12. A detection circuit in a magnetic recording and playback apparatus in which data which is recorded on a magnetic recording medium by a head is read out, said read out data being detected by said detection circuit to obtain the original data, wherein with R(f) representing the frequency response of the playback signal, th e frequency characteristics of the plurality of equalization target waveforms can be expressed as G(f)*Hi(f) (where i=1, 2, 3, . . . , n, n being natural number), said detection circuit comprising:
   an amplifier circuit which amplifies a signal from a head;
   a low-pass filter which passes only low-frequency components of said amplified signal;
   a pre-equalizer, connected to the output of said low-pass filter, and constituted so as to have the response G(f)/R(f);
   a plurality of combination circuits which are connected in parallel to the output side of said pre-equalizer, each combination circuit being formed by a post-equalizer which is constituted so as to have a response of Hi(f) (where i=1, 2, 3, . . . n, n) and a detector connected in series therewith to detect different target waveforms in accordance with the equalized waveform output from said post-equalizer;
   a switching circuit which is connected to said plurality of combination circuits, each of which is formed by a post-equalizer and a detector, and which selects the output of just one of said combination circuits as the output of said detection circuit depending on the characteristics of the target waveform for data being read out by the head, said switching circuit selecting said target waveform before said plurality of combination circuits connected in parallel have completed their operations; and
   a switching control means which control said switching circuit.

13. A detection circuit according to claim 12, wherein said pre-equalizer is formed by a closed-loop type adaptive equalizer, said closed-loop adaptive equalizer comprising:
   a plurality of delay circuits;
   a plurality of multipliers;
   an adder;
   a target waveform table in which target equalization waveforms are stored;
   a square error calculating circuit which calculates the error or the square error between the output of said pre-equalizer and said target equalization waveform; and
   a tap coefficient calculating circuit which calculates, from the calculated error, tap coefficients as the equalization setting values for generating said equalization waveforms of two or more different types of characteristics;
   said target equalization waveforms which are stored in said target waveform table being selected by said switching control means.

14. A detection circuit according to claim 13, wherein said low-pass filter is a pre-filter having a boost function, the response of said adaptive equalizer, to which the output G'(f) of said pre-filter is input, being set to G'(f)/R(f), the amount of boost of said pre-filter being input to said switching control means, a determination being made by said switching control means, based on this boost amount and the setting value of said adaptive equalizer, of the normalized recording density, and said switching circuit being switched by the output of said switching control means.

15. A detection circuit according to claim 14, wherein one of said pluralities of combinations, each of which is formed by a post-equalizer and a detector, is used for Partial Response Class 4 Maximum Likelihood detecting, and another of said pluralities of combinations, each of which is formed by a post-equalizer and a detector, is used for Extended Partial Response Class 4 Maximum Likelihood detecting.

16. A detection circuit according to claim 15, further comprising a clock generating means, said switching circuit having a gating means which, by means of a signal from said switching control means, gates a clock signal which is sent to said detector so that said clock signal is sent to only one detector.

17. A detection circuit according to claim 16, wherein the functioning of each of said detectors is stopped and the output thereof is fixed at 0 when that detector does not receive said clock signal input.

18. A detection circuit according to claim 15, wherein (1+D) equalization is performed by said filter and adaptive equalizer, the output of said adaptive equalizer being taken as the Partial Response Class 4 waveform, one equalizer-detector circuit which uses the Partial Response Class 4 Maximum Likelihood detecting method performing adaptive equalization, phase error detection, and amplitude error detector with the Partial Response Class 4 signal, and wherein in another equalizer-detector circuit, which uses the Extended Partial Response Class 4 Maximum Likelihood detecting method, a waveform for Extended Partial Response Class 4 is generated by said post-equalizer, which uses delay circuits and an adder to perform a (1+D) calculation.

19. A detection circuit according to claim 15, wherein said switching control means compares a tap coefficient from said adaptive equalizer with a tap coefficient reference value, and generates and sends to said switching circuit a signal which switches between Partial Response Class 4 Maximum Likelihood and Extended Partial Response Class 4 Maximum Likelihood.

20. A detection circuit according to claim 15, wherein an Run Length Limited code having a limitation of continuous 0s in the cases of an alternating odd and even stream is commonly used for both Partial Response Class 4 Maximum Likelihood detecting method and Extended Partial Response Class 4 Maximum Likelihood detecting method in the system for recording onto said recording medium, and a length of the path memory of the Extended Partial Response Class 4 Maximum Likelihood detector is shortened.

21. A detection circuit according to claim 12, wherein said switching control means switches said switching means in response to data received from the head by reading a training pattern.

* * * * *